United States Patent
Ranganathan et al.

(10) Patent No.: US 8,571,539 B1
(45) Date of Patent: Oct. 29, 2013

(54) METHOD, DEVICE, AND SYSTEM FOR PROVIDING A NOTIFICATION OF A SHUTDOWN

(75) Inventors: Vijayalakshmi Ranganathan, Delray Beach, FL (US); Bizhan Karimi-Cherkandi, Boca Raton, FL (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 13/561,251

(22) Filed: Jul. 30, 2012

(51) Int. Cl.
*H04M 3/00* (2006.01)
(52) U.S. Cl.
USPC .............. 455/419; 455/125.5; 455/127.1; 455/343.2; 455/522; 455/67.11; 455/466
(58) Field of Classification Search
USPC ............ 455/125.5, 127.1, 343.2, 522, 67.11, 455/466, 574
See application file for complete search history.

(56) References Cited

U.S. PATENT DOCUMENTS

| | | | |
|---|---|---|---|
| 2005/0156748 A1* | 7/2005 | Lee | 340/636.1 |
| 2005/0215229 A1* | 9/2005 | Cheng | 455/404.1 |
| 2005/0255894 A1* | 11/2005 | Heller | 455/572 |
| 2009/0117889 A1 | 5/2009 | Varanda | |
| 2009/0325613 A1* | 12/2009 | Kuulusa et al. | 455/466 |

OTHER PUBLICATIONS

PCT/US201039804 for Method, Device and System for Locating a Mobile Terminal Device filed on May 29, 2012.

* cited by examiner

*Primary Examiner* — Kwasi Karikari
(74) *Attorney, Agent, or Firm* — Buchanan Ingersoll & Rooney PC

(57) ABSTRACT

A method and apparatus for transmitting a notification of a shutdown event includes a communication terminal turning off or otherwise shutting down and prior to turning off sending a notification to a third party device such as an access point, base station, server, or proxy, that identifies information relating to the shutting down of the terminal such as a location, purpose for the shutdown and other relevant information. Subsequent devices that attempt to establish a communication connection with the terminal may then receive the notification or information from the notification via the third party device. The sending of information relating to the notification or the notification by the third party can also trigger another action. One example of such an action is the forwarding of the communication connection request to another device to receive that request based upon a predefined rule or a predefined forwarding address.

19 Claims, 4 Drawing Sheets

METHOD, DEVICE, AND SYSTEM FOR PROVIDING A NOTIFICATION OF A SHUTDOWN

FIELD OF THE INVENTION

The present invention relates to communication systems, such as communication systems that utilize cellular phones, mobile computer devices, tablets, laptops, other types of terminal devices and other types of communication devices. More particularly, the present invention relates to a system, method and device configured to permit a communication terminal device to inform another device via a notification relating to a shutting down or turning off of the communication terminal device.

BACKGROUND OF THE INVENTION

Communication terminals such as laptops, tablets, internet appliances, and cellular phones may be configured to engaging in telephone calls, video calls, or other types of communication session such as instant messaging or text messages sent via a short message service. An example of such a communication terminal is disclosed in International Patent Application No. PCT/US2012/039804, which was filed on May 29, 2012 and is an application that is also owned by the assignee of the present application. The entirety of International Patent Application No. PCT/US2012/039804 is incorporated by reference herein.

If a user uses one device to attempt to contact a user of another device but does not establish a connection for a communication session with a user associated with that other device, there is often no way of determining why that attempted connection failed. Also, if a user is involved in a session with another user and then has the session dropped, there is typically no way to communicate why the session failure occurred between the users. This is particularly true when the dropping of the session is due to a loss of power by one of the communication terminals used in the communication session.

We have determined that a new device, system, and method are needed for communication systems. We have determined that such apparatuses and methods may be configured to provide a notification to a party or terminal attempting to contact an unavailable party so that they may learn of details related to the non-response to the attempted contact.

SUMMARY OF THE INVENTION

A communication system includes a first communication terminal and a first communication device communicatively connectable to the first communication terminal. The first communication terminal detects one of (i) a power level of the first communication terminal being at or below a predetermined level and (ii) a receipt of input instructing the first communication terminal to shut down. The first communication terminal sends a first notification message to the first communication device in response to the detected power level being at or below the predetermined level or in response to the receipt of the input. The first notification message includes information indicating one of the detected power level of the first communication terminal and the receipt of the input instructing the first communication terminal to shut down.

In some embodiments, the first communication terminal is a terminal device that utilizes a battery for powering the device, such as a cellular phone, a mobile phone, a laptop computer, a tablet or other mobile computer device. The battery may be a rechargeable battery or a disposable battery, for example. The power level of the first communication terminal may be a detected remaining battery life. The first notification message that is sent may be a text message or may be another type of message such as an email message or a message sent via a network connection such as an internet connection.

In one embodiment of the system, the first communication device may be a communication terminal that has an established telephone call with the first communication terminal and the first notification message may be a text message that indicates that the telephone call was terminated due to the battery life of the first communication terminal being at a value sufficient for causing a shutdown of the first communication terminal. For such embodiments, the first communication device may be a tablet having voice over internet telephony functionality or video telephone functionality, or a cellular phone or a computer device having telephony functionality.

In other embodiments, the first communication device may be a computer device that hosts one or more communication services such as a server or a switch device. The first communication device may be a device that hosts one or more communication services for an emergency service provider for example.

It should be appreciated that the first notification message may have different types of information included therein. For example, the first notification message may have information indicating the detected power level of the first communication terminal and also include information indicating a geographical location of the first communication terminal. The first notification message may also include information indicating that a redirection of a request for initiating a communication session such as a telephone call, instant messaging session, or receipt of a text message, is to be redirected. It should be understood that information indicating that a redirection of a request for initiating a communication session may also include information identifying which device should receive the redirected request. The first notification message may also include one or more images and audio captured by a camera sensor or a microphone of the first communication terminal. The one or more images may be a picture image or may be a video that is captured by the first communication terminal after the first communication terminal detected the predetermined power level or receives the input to provide at least one image of an environment adjacent the terminal at the time it shuts down, or is deactivated. The first notification message may also include information about a user of the first communication terminal, such as a name, address, or a picture of the user.

In some embodiments of the system, the first communication device is a base station or an access point. In one embodiment, the first communication device may be a radio cellphone tower for providing access to a cellular network or a router for providing access to at least one of a wide area network and a local area network. In other embodiments, the first communication device may be a voice mailbox device or a switch device such as a softswitch or a private branch exchange device.

In one embodiment, the first communication device may be configured to redirect requests to initiate a communication session to a second communication terminal associated with the user of the first communication terminal after receiving the first notification message. The second communication terminal that receives the redirected requests may be a terminal device that is determined to be nearest the geographical location of the first communication terminal at the time the first notification message was sent or the geographical location of the first communication terminal as identified in the first notification message.

A method for providing a notification of a shutdown event is also provided. The method may include the steps of a first communication terminal detecting one of a power level of the first communication terminal being at a predetermined level and a receipt of input instructing the first communication terminal to shut down and the first communication terminal sending a first notification message to a first communication device in response to the detected power level being at or below the predetermined level or in response to the receipt of the input. The first notification message may include information indicating one of the detected power level and receipt of the input.

It should be understood that embodiments of the above mentioned communication systems may be utilized for operating an embodiment of the method. Embodiments of first communication terminals may also be utilized for operating an embodiment of the method. Examples of such embodiments may also be further appreciated from the below.

Embodiments of the method may also include the first communication terminal sending a second notification message to a second communication terminal to which the first communication terminal has an established communication session and the first communication terminal detected the power level of the first communication terminal being at the predetermined level. For example, the first and second communication terminals may have an instant messaging session, a telephone connection for a telephone conference, a telephone call connection, video call connection, or video conference connection.

Other embodiments of the method may be configured so that a first notification message is sent any time a communication session is established between the first communication terminal and a communication device associated with an emergency service provider such as a police department. If such a communication session is detected as being established, such as a telephone call to a phone number predefined as being associated with an emergency service provider (e.g. *911 or 911 telephone numbers) the first communication terminal may send the first notification message regardless of what its power level is at.

Embodiments of the method may also include additional steps. For example, a camera sensor of the first communication terminal may capture at least one image of an environment around the terminal prior to it shutting down and include that captured at least one image in the first notification message.

A non-transitory computer readable medium is also provided. Such a computer readable memory may be memory of a communication terminal such as a hard drive, flash drive, or other memory device of a communication terminal. The computer readable medium may have an application stored thereon that is executable by a communication terminal and define steps performed by the terminal when it is executed by the terminal. The method defined by the application may include embodiments of the above mentioned method or may include other variations of such a method as may be appreciated from the below.

In one embodiment, the method defined by the application may include the step of the communication terminal detecting a power level of the first communication terminal being at or below a predetermined level or a receipt of input instructing the first communication terminal to shut down. The method may also include the step of the terminal sending a first notification message to a first communication device in response to the detected power level being at or below the predetermined level or in response to the receipt of the input. The first notification message may include a detected power level of the terminal and may also include other information. For instance, the first notification message may include geographical location information or other information as noted above or as may be further appreciated from the below.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

DETAILED DESCRIPTION OF EXEMPLARY EMBODIMENTS

Figure 1:
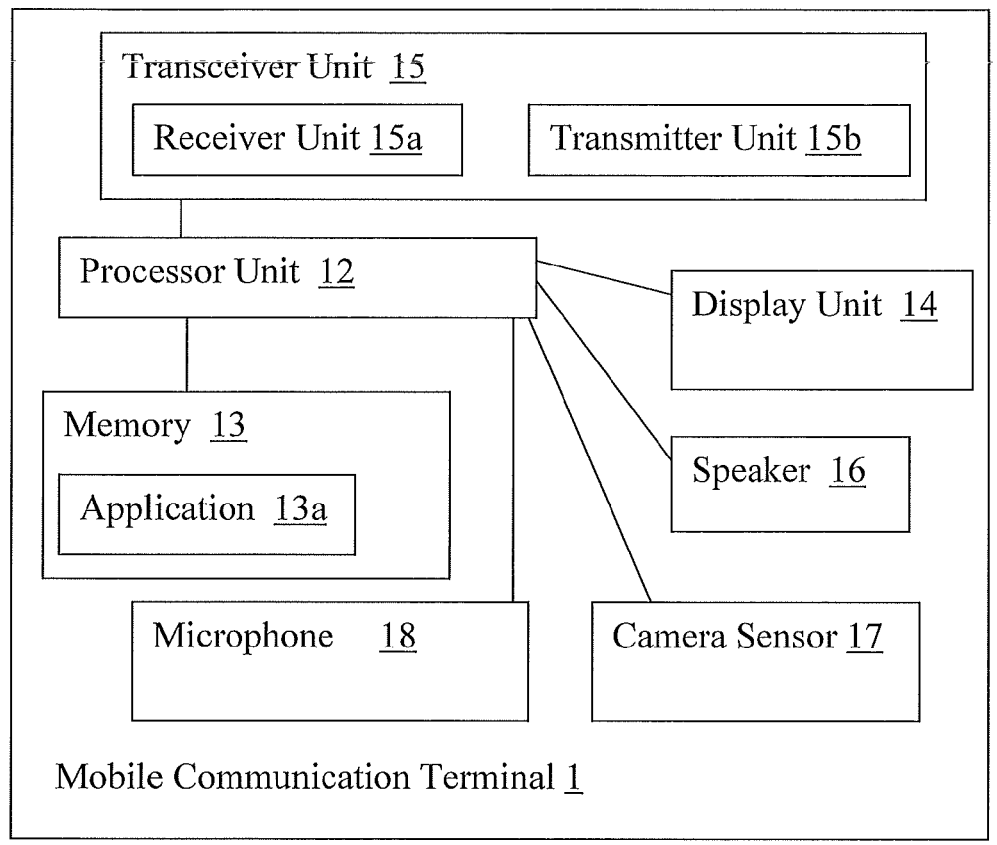
FIG. 1 is a block diagram of an exemplary embodiment of a communication terminal.
Figure 2:
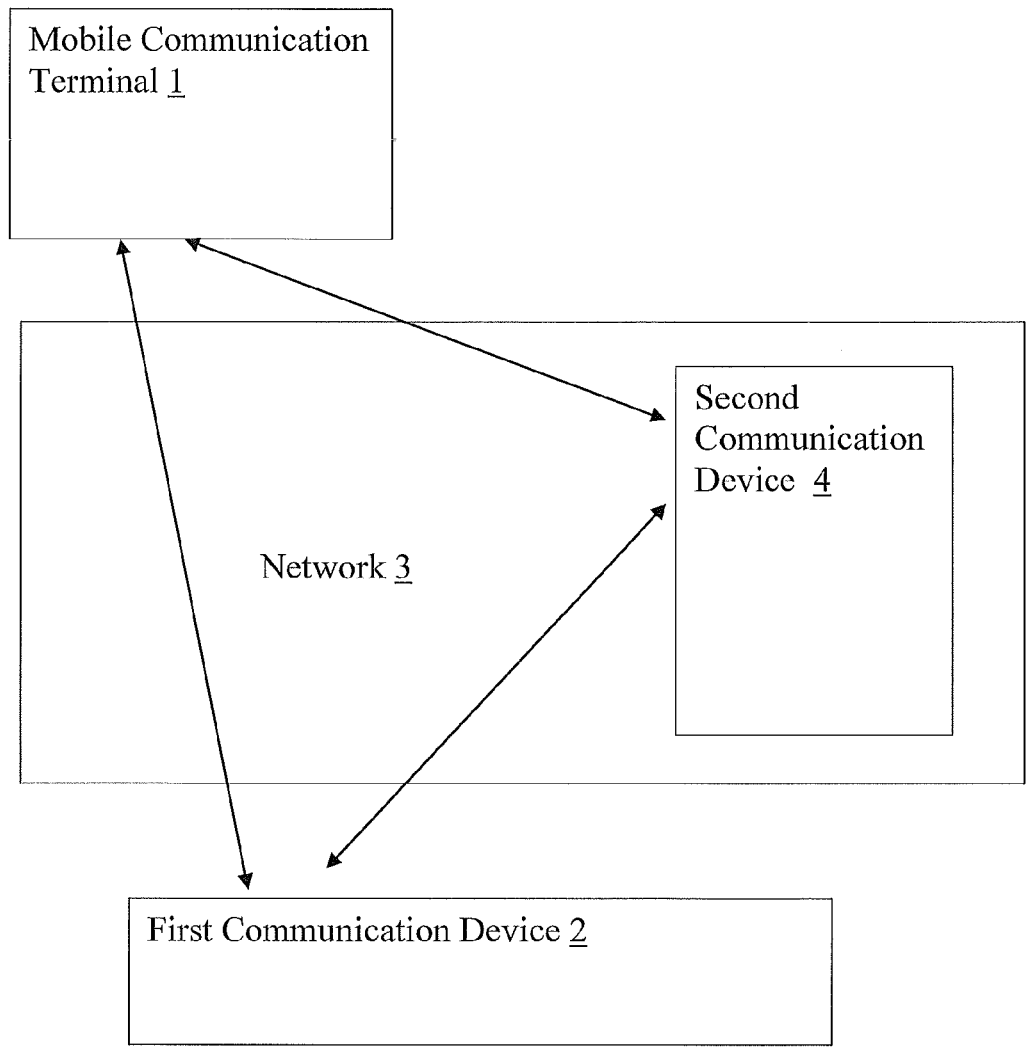
FIG. 2 is a block diagram of an exemplary embodiment of a communication system.

Referring to FIGS. 1-5, a mobile communication terminal 1 may be connected to a network 3 via an access point (not shown) such as a router, base station or other type of access point. The mobile communication terminal 1 may be communicatively connected to a first communication device 2 and a second communication device 4 via the network 3. The mobile communication terminal may be a mobile telephone device, a cellular phone, a tablet, a laptop, a mobile internet appliance, a personal digital assistant, or another type of mobile computer device.

The first and second communication devices 2 and 4 may be any of a number of different types of computer devices. For example, the first communication device 2 may be another communication terminal such as a computer, a laptop, a telephone device, a cellular phone, a tablet, an internet appliance, or may be another type of computer device such as a network node, a switch device, an access point, a base station, or a server that hosts a service. The second communication device 4 may be a computer device such as a network node, an access point, a base station, a server that hosts a service, a switch device, or other type of computer device. The first and second communication devices 2 and 4 may also be communicatively connected to each other. For example, the first and second communication devices 2 and 4 may be communicatively connected via a network connection that involves a transmission path that passes through the network 3.

The network 3 may be a wide area network such as an enterprise network or the internet. Alternatively, the network may be a local area network. In one embodiment, the network 3 may be a cellular network or may include a cellular subnetwork.

It should be understood that the network 3 may comprise a number of network node elements that may include one or more access points, one or more border elements, one or more severs that host communication services and one or more other network nodes. The network elements may be communicatively coupled via wireless transmission paths, wired transmission paths or a combination of wired and wireless transmission paths. The transmission of messages via the network may involve passing along a number of hops, or network elements as a sent message travels across a transmission path to an addressed recipient.

As shown in FIG. 1, the mobile communication terminal 1 includes a processor unit 12 that is communicatively connected to a transceiver unit 15, memory 13, a display unit 14, a speaker 16 and a camera sensor 17. The memory may be non-transitory memory such as a hard drive or a flash drive and may have at least one application 13a stored thereon such that the processor unit 12 can execute that application 13a. The application 13a may define steps of a method that are performed by the communication terminal when the application 13a is executed. The transceiver unit 15 may include at least one receiver unit 15a and at least one transmitter unit 15b. The transceiver unit 15 may include an interface for wireless communication paths and wired communication paths for receipt of data and the transmission of data. The display unit 14 may be a touch screen display or may be another type of display such as a liquid crystal display or a monitor. The speaker 16 may emit audio and the microphone 18 may receive and record audio as input to the processor unit 12. Some audio recorded by the microphone may be stored on the memory 13. The camera sensor may include a camera sensor configured to capture still images, video, or both video and still images of the environment around the communication terminal. In some embodiments, audio recorded by the microphone 18 may also be included within a recorded video. Of course, other input devices may also be communicatively connected to the processor unit 12 such as one or more buttons, a keyboard, a keypad, a scanner, or another type of input device. Other output devices can also be connected to the communication terminal such as a printer or other output device.

Figure 3:
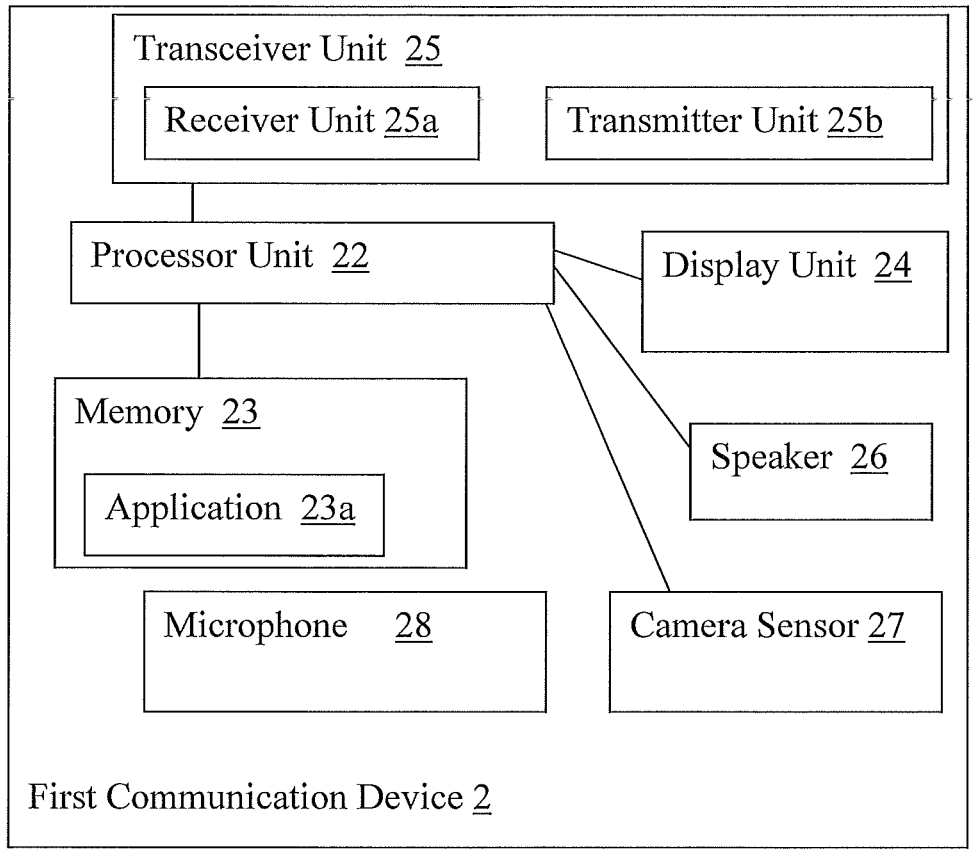
FIG. 3 is a block diagram of an exemplary embodiment of a communication device that may be utilized in embodiments of the communication system.
Figure 4:
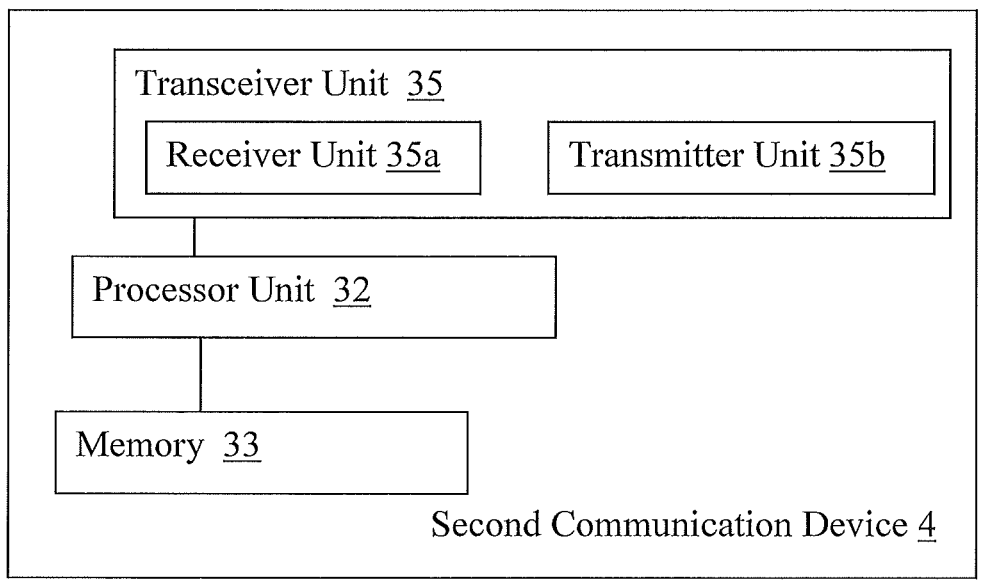
FIG. 4 is a block diagram of another exemplary embodiment of a communication device that may be utilized in embodiments of the communication system.
Figure 5:
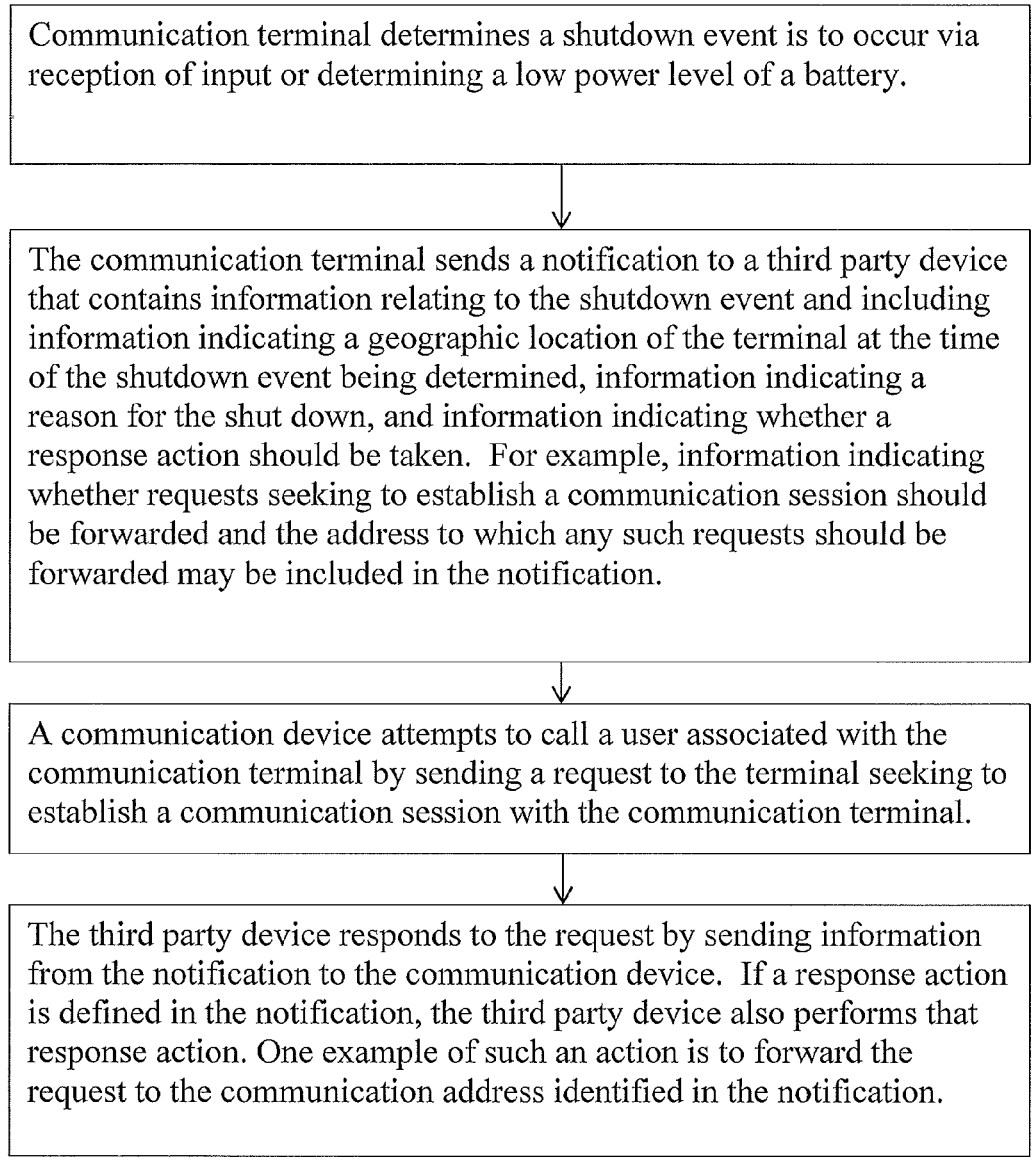
FIG. 5 is a flow chart illustrating an exemplary embodiment of a method for providing a notification relating to a shutdown event of a communication terminal.

As shown in FIG. 3, the first communication device 2 may be configured similarly to the communication terminal 1. The first communication device 2 may include a processor unit 22 that is communicatively connected to a transceiver unit 25, memory 23, a display unit 24, a speaker 26 and a camera sensor 27. The memory may be non-transitory memory such as a hard drive or a flash drive and may have at least one application 23a stored thereon such that the processor unit 22 can execute that application 23a. The application 23a may define steps of a method that are performed by the first communication device 2 when the application 23a is executed. The transceiver unit 25 may include at least one receiver unit 25a and at least one transmitter unit 25b. The transceiver unit 25 may include an interface for wireless communication paths and wired communication paths for receipt of data and the transmission of data. The display unit 24 may be a touch screen display or may be another type of display such as a liquid crystal display or a monitor. The speaker 26 may emit audio and the microphone 28 may receive and record audio as input to the processor unit 22. Some audio recorded by the microphone may be stored on the memory 23. The camera sensor may include a camera sensor configured to capture still images, video, or both video and still images of the environment around the communication terminal. Of course, other input devices may also be communicatively connected to the processor unit 22 such as one or more buttons, a keyboard, a keypad, a scanner, or another type of input device. Other output devices can also be connected to the communication terminal such as a printer or other output device. In alternative embodiments, the first communication device may be configured similarly to the second communication device 4 shown in FIG. 4.

The second communication device 4 includes a processor unit 32, a transceiver unit 35, and memory 33. The memory may include an application stored thereon that may be executable by the processor unit and define steps of a method that are performed by the second communication device when the application is executed. The transceiver unit 35 may include at least one receiver unit 35a and at least one transmitter unit 35b. The transceiver unit 35 may include an interface for wireless communication paths and wired communication paths for receipt of data and the transmission of data. It should be understood that one or more input devices and one or more output devices may also be communicatively coupled to the second communication device 4 or the processor unit 32 of the second communication device 4. For example, one or more display units may be communicatively coupled to the second communication device. Examples of the second communication device 4 may include a base station of a cellular network or an access point of an enterprise network, a switch device such as a softswitch or other switch that provides services for establishing communication connections between devices, a voice mailbox device, or a server that hosts a communication service. Of course, alternative embodiments of the second communication device 4 may be configured as a communication terminal or may otherwise be configured similarly to the first communication device 2 as shown in FIG. 3.

The mobile communication terminal 1 may be configured to provide a shutdown event detection and subsequent messaging to one or more other devices to identify the imminent shutting down of the mobile communication terminal. For instance, the application 13a may be executed by the processor unit 12 such that the communication terminal performs a method such as steps of the method illustrated in FIG. 5 or a variation of the method shown in FIG. 5 as may be appreciated from the above and the below. The one or more other devices that receive a notification message may then use information contained in that message for other purposes. For example, a device that received a notification message about the imminent shutdown of the mobile communication terminal may use information included in that message for informing parties or devices that attempt to connect to the mobile communication terminal while that terminal is shut off that the terminal is currently unavailable because it is turned off.

The mobile communication terminal 1 may be powered by a battery. The processor unit 12 may be configured to run application 13a to determine that the battery power is at a predetermined level that correlates to a power level that will result in an imminent automatic shutdown of the communication terminal 1 due to low battery life. Examples of a shutdown may be a deactivation of the communication terminal or a turning off of the communication terminal. A detection of the low battery power level may result when only one percent, two percent, three percent, four percent, or five percent of the battery life is detected as remaining, for example. Such an imminent shutdown event may also be detected upon receipt of input from a user that is provided to actuate a shutdown, turning off, or deactivation of the mobile communication terminal 1.

In response to the detected imminent shutdown event, the processor unit 12 may cause a notification message to be sent to at least one of the first communication device 2 and the second communication device 4 to provide a notification of the communication terminal shutting down and to provide information indicating the reason for the shutdown (e.g. receipt of user input for turning the communication terminal off, a detection of a low battery life, etc.) prior to the terminal being deactivated. The notification may also include other information such as a percentage of battery life remaining for the mobile communication terminal, information indicating a geographical location of the communication terminal, a picture or video of the environment near the terminal at the time of the detected imminent shutdown event, information indicating that communication attempts directed to the mobile communication terminal 1 are to be forwarded or otherwise redirected to another device and an address such as a phone number of other communication address of the other device to which communication attempts are to be forwarded or otherwise redirected. It should be understood that information relating to the geographical location of the communication terminal may be geographical location information the communication terminal previously received from a location service such as a global positioning service or a location service that utilizes another type of location detection mechanism. The notification that is sent can also include other information such as predefined text for inclusion in a message, such as text for sending as a short messaging service message that indicates that the terminal was shut down due to low battery life or information for inclusion in a prerecorded voice message to be played to a party attempting to establish a voice connection with the turned off communication terminal.

The notification message sent by the communication terminal 1 may be sent via the transceiver unit 15 to the first communication device 2 if a communication session is active at the time of the shutdown event. The notification message may include information indicating that the termination of the communication session was due to the terminal deactivating as a result of low battery life so that a user of the first communication device 2 is able to quickly understand why the communication session was terminated. The communication session may be a phone call for example and the notification may be a text message sent to the first communication device 2 that is sent prior to the deactivation of the mobile communication terminal 1 that includes predefined text to be displayed by the first communication device 2 to inform the user of that device why the communication session was terminated.

In addition to providing a notification to the first communication device 2, the mobile communication terminal 1 may also send a second notification to the second communication device 4. The second communication device 4 may be a server that hosts a communication service such as call forwarding or call routing or host some other type of communication service such as emergency contact services or other service. Alternatively, the second communication device 4 may be a base station or access point that is nearest the mobile communication terminal 1 or is currently assigned to the mobile communication terminal 1 to provide the mobile communication terminal 1 with access to the network 3.

The second communication device 4 may receive the same notification as sent to the first communication device 2 or may receive a different notification message. The notification message sent to the second communication device 4 may be configured to inform the second communication device 4 of the shutdown of the mobile communication terminal and also provide that device with additional information for use in providing a service to the mobile communication terminal or the user of that terminal.

For example, the notification sent to the second communication device 4 may be a message sent via a network connection such as a cellular network connection or may be sent directly to that device via a direct wireless connection or direct wired connection. For instance, the second communication device 4 may be a network node of the network 3. The second communication device 4 may be a base station that is providing access to a cellular network or may be an access point that provides access to an enterprise network, for example. The notification sent to the second communication device 4 may include information indicating the power level of the battery of the communication terminal at the time of the detected imminent shutdown event, the last known geographical coordinates of the communication terminal 1 that was obtained via a location service such as a global positioning service or other location service, a picture or video captured by the camera sensor 17 prior to the sending of the notification and after detecting of the imminent shutdown event and information indicating whether call forwarding or other communication session redirecting should be actuated.

If information indicating that call forwarding or other communication session redirecting should occur, information indicating an address of another communication terminal may also be included in the notification sent to the second communication device 4. Alternatively, the second communication device 4 may respond to the receipt of such information by redirecting a subsequently received communication session request intended for the mobile communication terminal such as a request to establish a phone call or send a text message so that the request is redirected to a communication terminal associated with the user of the mobile communication terminal 1 that is identified as being nearest the geographical location identified in the second notification message. To provide such communication session redirecting, the second communication device 4 may communicate with a presence server or other network node to determine the location of other devices associated with the user of the mobile communication terminal 1 for identifying which device is to receive the redirected attempted communication session connection. The second communication device 4 may also simply redirect any communication session to any address of a device that is predefined by a user of the communication terminal so that upon receipt of a notification of an imminent shutdown, all communication sessions are automatically redirected to the predefined address established by user input communicated to the second communication device 4.

It should be understood that a notification may also be sent to additional devices. For instance, a notification may be sent to any communication device via a predefined address identified in input that is stored in the memory 13 of the communication terminal so that a third party or another device associated with the user receives a notification message in addition to any other communication devices.

In one contemplated embodiment, the first communication device 2 is a server or other communication device managed or overseen by emergency services provider such as the police of a municipality. The detected shutdown event could result in a message being sent to the emergency services communication device and include information indicating a power level remaining in the battery of the mobile communication terminal so that such information may be taken into account when providing emergency services to a user of that terminal. For example, the emergency center communication device may keep the communication terminal traceable at the cost of tearing down a call or keeping the emergency call with minimal functions (e.g. video being turned off) to preserve battery life of the communication terminal 1 and permit better tracking of the location of that terminal. Such information may be particularly useful in situations where an emergency call is made in connection with the user of the terminal being kidnapped or being taken hostage. In one contemplated embodiment, the communication terminal may receive input from a user such as a code or a predefined emergency number to actuate the communication terminal sending such a notification to an emergency service provider communication device. The notification may be sent even though the power level of the mobile communication terminal is not low and the user has not provide input for shutting down the mobile communication terminal 1 so that the emergency service provider can take into account the location and power level of the mobile communication terminal when providing an emergency service to a user of the mobile communication terminal. The emergency service provider communication device may be a workstation, a server, or other communication device.

In yet another contemplated embodiment, the communication terminal may be configured to determine that it is about to be turned off due to either user input or a detection of a low remaining battery life such as a battery life that is below 10% of the total battery life of the battery. In response to such detection, the processor unit 12 may actuate the camera sensor 17 to capture one or more images such as a photo or a video of the area or environment near the mobile communication terminal. Such data may be saved in the memory 13 and included in a notification message sent to a communication device. The image or video may then be used for providing other services to a user. For instance, the video or image may be forwarded to another device associated with the user to help aid the user's ability to find the communication terminal in the event it was misplaced prior to the terminal becoming deactivated.

Of course, there are a number of variations to the communication terminal, communication system, computer readable medium, and methods disclosed herein to meet different design objectives. For example, the memory of the communication terminal may be memory of a compact disc, DVD or other memory device connected to the communication terminal. The application stored on the memory may also be an application downloaded from a remote server. As another example, the mobile communication terminal may be configured to utilize any of a number of battery options such as rechargeable batteries or other remote power sources that may require recharging.

While certain present preferred embodiments of a communication terminal, non-transitory computer readable medium executable by a communication terminal, a communication system, and methods of making and using the same have been shown and described above, it is to be distinctly understood that the invention is not limited thereto but may be otherwise variously embodied and practiced within the scope of the following claims.

What is claimed is:

1. A communication system comprising:
   a first communication terminal;
   a first communication device communicatively connectable to the first communication terminal;
   the first communication terminal detecting one of (i) a power level of the first communication terminal being at or below a predetermined level and (ii) a receipt of input instructing the first communication terminal to shut down;
   the first communication terminal sending a first notification message to the first communication device in response to the detected power level being at or below the predetermined level or in response to the receipt of the input; and
   wherein the first notification message comprises information indicating one of the detected power level of the first communication terminal and the receipt of the input instructing the first communication terminal to shut down and wherein the first notification message also comprises information indicating a geographical location of the first communication terminal; and
   in response to receipt of the first notification message, the first communication device redirecting any request to initiate a communication session intended for the first communication terminal to a second communication terminal that is associated with a user of the first communication terminal and is determined to be nearest to the geographical location of the first communication terminal.

2. The system of claim 1 wherein the power level of the first communication terminal is a remaining battery life and the first notification message is a text message and the first communication device is a communication terminal that has an established telephone call with the first communication terminal and wherein the text message indicates that the telephone call was terminated due to the battery life of the first communication terminal being at a value sufficient for causing a shutdown of the first communication terminal.

3. The system of claim 1 wherein the first communication device is a computer device that hosts one or more communication services for an emergency service provider and wherein the first notification message has the information indicating the detected power level of the first communication terminal.

4. The system of claim 3 wherein the first notification message is sent while the first communication terminal is engaged in a telephone call with the first communication device.

5. The system of claim 1 wherein the first communication device is a base station, an access point, a voice mailbox device or a switch device.

6. A communication system comprising:
   a first communication terminal;
   a first communication device communicatively connectable to the first communication terminal;
   the first communication terminal detecting one of (i) a power level of the first communication terminal being at or below a predetermined level and (ii) a receipt of input instructing the first communication terminal to shut down;
   the first communication terminal sending a first notification message to the first communication device in response to the detected power level being at or below the predetermined level or in response to the receipt of the input; and
   wherein the first notification message comprises information indicating one of the detected power level of the first communication terminal and the receipt of the input instructing the first communication terminal to shut down;
   wherein the first notification message also comprises information indicating that a redirection of a request for initiating a communication session is to be provided by the first communication device and wherein the first communication device is a base station or an access point; and wherein the first notification message also comprises information indicating a geographical location of the communication terminal and wherein the first communication device redirects the request to a second communication terminal that is associated with a user of the first communication terminal and is determined to be nearest to the geographical location of the first communication terminal.

7. The system of claim 6 wherein the request for initiating the communication session comprises a sent text message or a request for establishing a telephone call.

8. A method for providing a notification of a shutdown event comprising:
a first communication terminal detecting one of (i) a power level of the first communication terminal being at or below a predetermined level and (ii) a receipt of input instructing the first communication terminal to shut down;
the first communication terminal sending a first notification message to a first communication device in response to the detected power level being at or below the predetermined level or in response to the receipt of the input; and
wherein the first notification message comprises information indicating one of the detected power level of the first communication terminal and the receipt of the input instructing the first communication terminal to shut down and wherein the first notification message also comprises information indicating a geographical location of the communication terminal; and
in response to receipt of the first notification message, the first communication device redirecting a request to initiate a communication session intended for the first communication terminal to a second communication terminal that is associated with a user of the first communication terminal and is determined to be nearest to the geographical location of the first communication terminal.

9. The method of claim 8 wherein the the first communication device is a voice mailbox device, a server, or a switch device.

10. A method for providing a notification of a shutdown event comprising:
a first communication terminal detecting one of (i) a power level of the first communication terminal being at or below a predetermined level and (ii) a receipt of input instructing the first communication terminal to shut down;
the first communication terminal sending a first notification message to a first communication device in response to the detected power level being at or below the predetermined level or in response to the receipt of the input; and
wherein the first notification message comprises information indicating one of the detected power level of the first communication terminal and the receipt of the input instructing the first communication terminal to shut down;
wherein the first notification message also comprises information indicating that a redirection of a request for initiating a communication session is to be provided by the first communication device and wherein the first notification message also comprises information indicating a geographical location of the communication terminal;
first communication device redirecting the request to a second communication terminal that is associated with a user of the first communication terminal that is determined to be nearest to the geographical location of the first communication terminal; and
wherein the first communication device is a base station or an access point.

11. The method of claim 10 further comprising:
the first communication terminal sending a second notification message to a second communication terminal, the first communication terminal having an established communication session with the second communication terminal when the first communication terminal detected the power level of the first communication terminal being at the predetermined level.

12. The method of claim 10 further comprising:
the first communication terminal determining whether the first communication terminal has established a communication connection with the first communication device for a communication session, wherein the first communication device is associated with an emergency services provider; and
sending the first notification message in response to determining that the communication session is with the first communication device.

13. The method of claim 12 wherein the communication session is a telephone call.

14. The method of claim 10 wherein the power level of the first communication terminal is a remaining battery life and the first notification message is a text message and wherein the text message indicates that a telephone call was terminated due to the battery life of the first communication terminal being at a value sufficient for causing a shutdown of the first communication terminal.

15. The method of claim 10 wherein the request for initiating the communication session comprises a sent text message or a request for establishing a telephone call.

16. The method of claim 10 wherein the first communication terminal determines that the power level of the first communication terminal is at or below the predetermined level; and
the method further comprising a camera sensor of the first communication terminal capturing at least one image of an environment around the first communication terminal prior to the first communication terminal shutting down; and
wherein the first notification message also comprises the at least one image.

17. A non-transitory computer readable medium having an application stored thereon that is executable by a communication terminal, the application defining steps of a method that are performed by the communication terminal when the application is executed by the communication terminal, the method comprising:
the communication terminal detecting one of (i) a power level of the communication terminal being at or below a predetermined level and (ii) a receipt of input instructing the communication terminal to shut down; and
the communication terminal sending a first notification message to a first communication device in response to the detected power level being at or below the predetermined level or in response to the receipt of the input such that the first communication device redirects a request for initiating a communication session with the communication terminal to another communication terminal that is associated with a user of the communication terminal that is determined to be nearest to a geographical location of the communication terminal;
wherein the first notification message comprises information indicating one of the detected power level of the communication terminal and the receipt of the input instructing the communication terminal to shut down; and wherein the first notification message also comprises information indicating that a redirection of the request for initiating a communication session with the communication terminal is to be provided by the first communication device and wherein the first notification message also comprises information indicating the geographical location of the communication terminal; and wherein the first communication device is a base station or an access point.

18. The computer readable medium of claim 17 wherein the communication terminal determines that the power level of the communication terminal is at the predetermined level; and the method further comprises a camera sensor of the communication terminal capturing at least one image of an environment around the communication terminal prior to the communication terminal shutting down; and wherein the first notification message also comprises the at least one image.

19. The computer readable medium of claim 17 wherein the power level of the communication terminal is a remaining battery life and the first notification message is a text message and wherein the text message indicates that a telephone call was terminated due to the battery life of the communication terminal being at a value sufficient for causing a shutdown of the communication terminal.

\* \* \* \* \*